US012608148B2

(12) United States Patent
Martin Langerwerf et al.

(10) Patent No.: US 12,608,148 B2
(45) Date of Patent: Apr. 21, 2026

(54) TECHNIQUES TO REDUCE POWER CONSUMPTION FOR A DISTRIBUTED COMPUTATIONAL MODEL MAPPED ONTO A MULTI-PROCESSING NODE SYSTEM

(71) Applicant: Intel Corporation, Santa Clara, CA (US)

(72) Inventors: Javier Martin Langerwerf, Toenisvorst (DE); Jeroen Leijten, Hulsel (NL); Gerard Egelmeers, Eindhoven (NL); Venkata Sudhir Konjeti, Eindhoven (NL)

(73) Assignee: Intel Corporation, Santa Clara, CA (US)

( * ) Notice: Subject to any disclaimer, the term of this patent is extended or adjusted under 35 U.S.C. 154(b) by 691 days.

(21) Appl. No.: 17/958,108

(22) Filed: Sep. 30, 2022

(65) Prior Publication Data

US 2024/0111444 A1    Apr. 4, 2024

(51) Int. Cl.
*G06F 3/00* (2006.01)
*G06F 1/10* (2006.01)
*G06F 3/06* (2006.01)

(52) U.S. Cl.
CPC ................ *G06F 3/064* (2013.01); *G06F 1/10* (2013.01); *G06F 3/0604* (2013.01); *G06F 3/0625* (2013.01); *G06F 3/0673* (2013.01)

(58) Field of Classification Search
CPC ...... G06F 3/064; G06F 3/0604; G06F 3/0625; G06F 3/0673; G06F 1/10
See application file for complete search history.

(56) References Cited

U.S. PATENT DOCUMENTS

| | | | |
|---|---|---|---|
| 7,127,561 B2 | 10/2006 | Hill et al. | |
| 7,620,791 B1 * | 11/2009 | Wentzlaff | G06F 12/0844 |
| | | | 711/202 |
| 9,170,946 B2 | 10/2015 | Hum et al. | |
| 9,411,725 B2 | 8/2016 | Gasparakis et al. | |
| 10,073,775 B2 | 9/2018 | Wilerkson et al. | |
| 2003/0131200 A1 * | 7/2003 | Berg | G06F 12/0817 |
| | | | 711/E12.027 |
| 2003/0169261 A1 * | 9/2003 | Emberling | G06T 1/20 |
| | | | 345/506 |

(Continued)

OTHER PUBLICATIONS

Angoletta, M. E., "Digital signal processor fundamentals and system design", CERN, Geneva, Switzerland, May 14, 2008, 63 pages.

(Continued)

*Primary Examiner* — Craig S Goldschmidt
(74) *Attorney, Agent, or Firm* — Nicholson De Vos Webster & Elliott LLP

(57) ABSTRACT

Examples include techniques to reduce power consumption for a distributed computational model mapped onto a multi-processing node system. Examples are described of processing nodes relaying indicator information to enable clock gate circuitry to determine whether or not to gate a clock to stall consuming compute circuitry based on availability of data to consume. Examples are also described of processing nodes relaying indicator information to enable clock gate circuitry to determine whether or not to gate a clock to stall producing compute circuitry based on available buffer capacity at a consuming compute circuitry.

25 Claims, 9 Drawing Sheets

Channel Token Scheme 300

Empty State 310

Full State 320

(56) References Cited

U.S. PATENT DOCUMENTS

| 2007/0079074 | A1 |  | 4/2007 | Collier et al. |
| 2014/0156950 | A1 |  | 6/2014 | Chew |
| 2021/0065437 | A1 | * | 3/2021 | Brkic ................... G06T 15/405 |
| 2022/0197803 | A1 |  | 6/2022 | Gupta et al. |
| 2022/0318614 | A1 | * | 10/2022 | Bajic .................... G06F 9/4843 |
| 2023/0091974 | A1 |  | 3/2023 | Gupta et al. |

OTHER PUBLICATIONS

Ettus Research, "RF Network-On-Chip (RFNoC™) Specification", Version 1.0.1, Published Dec. 17, 2021, 87 pages.

* cited by examiner

SDF Graph Topology Matrix 220

| | 101-1 | 101-2 | 101-P | Arcs/Comm Ch |
|---|---|---|---|---|
| | l | -m | 0 | 101-1 →— 101-2 |
| | k | 0 | -o | 101-1 —▲ 101-P |
| | 0 | n | -p | 101-2 —▲ 101-P |

SDF Graph 210

*FIG. 2*

Channel Token Scheme 300

Table 400

| Role | Local Indicator | Remote Indicator | Meaning after initializing with these local/remote indicators |
|---|---|---|---|
| Producer | 0 (wr) | 0 (rd) | No tokens in the channel, CAP spaces. Producer is not blocked. |
| Producer | N (wr) | 0 (rd) | wr-idc is N (0 < N <= CAP) tokens ahead of rd-idc, i.e. the channel has 1 or more tokens and there are less than CAP spaces available. If N == CAP the producer waits until the associated consumer updates the remote indicator after tokens are consumed. |
| Consumer | 0 (rd) | 0 (wr) | No tokens in the channel. The consumer waits until producer increments remote indicator to a value between 1 and CAP. |
| Consumer | 0 (rd) | N (wr) | N tokens in the channel because producer node has already provided "real" tokens for their consumption or at an initial stage (aka delay). |

*FIG. 4*

CONSUMER TOKEN STATES 600

FLOW 800

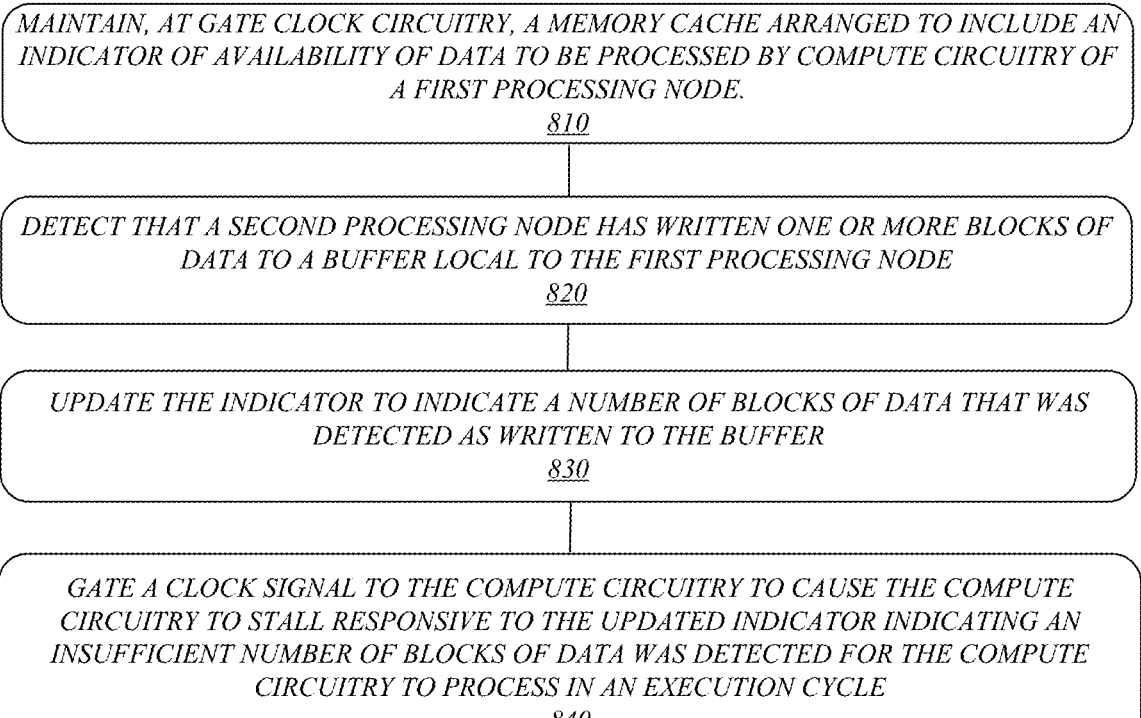

MAINTAIN, AT GATE CLOCK CIRCUITRY, A MEMORY CACHE ARRANGED TO INCLUDE AN INDICATOR OF AVAILABILITY OF DATA TO BE PROCESSED BY COMPUTE CIRCUITRY OF A FIRST PROCESSING NODE.
*810*

DETECT THAT A SECOND PROCESSING NODE HAS WRITTEN ONE OR MORE BLOCKS OF DATA TO A BUFFER LOCAL TO THE FIRST PROCESSING NODE
*820*

UPDATE THE INDICATOR TO INDICATE A NUMBER OF BLOCKS OF DATA THAT WAS DETECTED AS WRITTEN TO THE BUFFER
*830*

GATE A CLOCK SIGNAL TO THE COMPUTE CIRCUITRY TO CAUSE THE COMPUTE CIRCUITRY TO STALL RESPONSIVE TO THE UPDATED INDICATOR INDICATING AN INSUFFICIENT NUMBER OF BLOCKS OF DATA WAS DETECTED FOR THE COMPUTE CIRCUITRY TO PROCESS IN AN EXECUTION CYCLE
*840*

*FIG. 8*

*Storage Medium 900*

*Computer Executable
Instructions for 800*

*FIG. 9*

TECHNIQUES TO REDUCE POWER CONSUMPTION FOR A DISTRIBUTED COMPUTATIONAL MODEL MAPPED ONTO A MULTI-PROCESSING NODE SYSTEM

TECHNICAL FIELD

Examples described herein are generally related to techniques associated with synchronization-specific instructions implemented in functional units of processing nodes in a multi-processor system based on a distributed computational model.

BACKGROUND

A synchronous data flow (SDF) graph is a special case of Kahn process networks (KPNs), which can be used to describe signal processing systems that transform "infinite" streams of data using processes (e.g., processing nodes) that are connected via unbounded first-in-first-out (FIFO) communication channels (arcs) with each other. Writes routed via communication channels modeled in an SDF graph are non-blocking, while reads to the communication channels are blocking. For example, if a processing node requires data from one or more preceding processing nodes and the communication channel is empty, a process or workload remains blocked until a required amount of data (e.g., token(s)) is available in the communication channel. For a communication channel, a FIFO can only be read by a single processing node, and multiple processing nodes are not allowed to write to a single FIFO. The process or workload modeled to an SDF graph needs to be deterministic with regard to a data flow. For example, each processing node is arranged to produce a same amount of data (e.g., token(s)), regardless of the amount of data input.

BRIEF DESCRIPTION OF THE DRAWINGS

FIG. 2 illustrates an example SDF graph and an example SDF graph topology matrix.
FIG. 4 illustrates an example table for token indicators.
FIG. 8 illustrates an example logic flow.
FIG. 9 illustrates an example storage medium.

DETAILED DESCRIPTION

A multi-processor system can be arranged to operate on data to execute/implement a process or workload modeled based on an SDF graph. Each processor of the multi-processor system can include one or more cores. In some examples, a proper subset of the one or more cores of each processor can be arranged in a respective socket of a plurality of sockets as part of a system-on-a-chip (SoC) or a system-on-a-package (SoP). According to some examples, the multi-processor system is a heterogeneous multiprocessor system and the process or workload can be associated with a signal processing application partitioned into communicating tasks modeled based on the SDF graph. An example of this type of SDF graph-based programming model can be targeted to software-radio applications (e.g., used in a remote radio heads). In this type of SDF graph-based programming model, tasks self-synchronize based on an availability of data to be consumed by a consumer processing node or buffering space of a target processing node's memory for the producer processing node's output. A simple protocol that checks an availability of data and/or buffer space based on a comparison of indicators that point to a head and tail of buffers and a relationship with properties of used buffers can be enough to determine whether a self-synchronized task is allowed to be triggered. A technical challenge is performing this simple protocol in a way that has a lowest impact on an amount of circuitry area, performance and power usage overhead. To address this technical challenge, examples described in this disclosure detail a type of easy-to-use hardware (HW) acceleration for programmable processors operating on circular buffers implemented in software.

Figure 1:
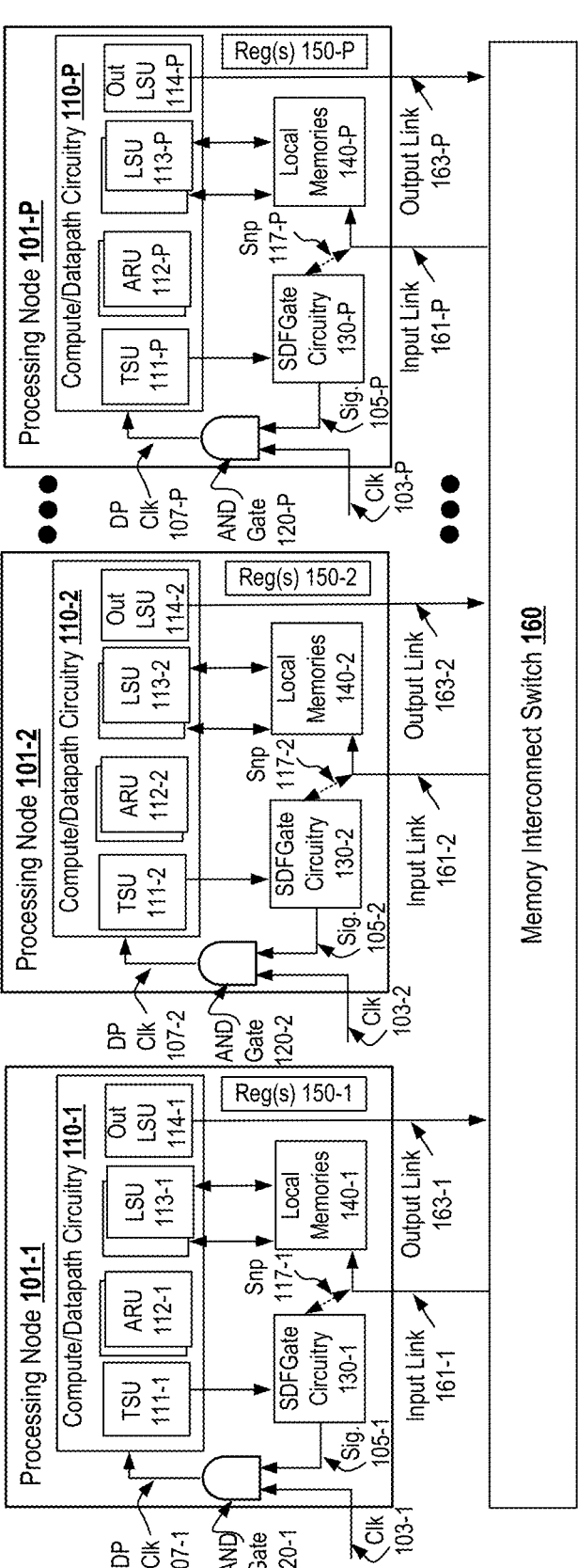
FIG. 1 illustrates an example system.

FIG. 1 illustrates an example system 100. In some examples, system 100 can be included in and/or operate within a compute platform. The compute platform could be located in a remote radio head for a base station for a wireless communication network (e.g., located in a tower mast at the base station), examples are not limited to remote radio heads. As shown in FIG. 1, system 100 includes processing nodes 101-1 to 101-P, where "P" represents any whole, positive integer>2. Processing nodes 101-1 to 101-P represent, in some examples, processors and/or processor cores of a multi-processor system. The multi-processor system can be arranged as a heterogeneous multi-processor that includes, but is not limited to, very long instruction word (VLIW) processors, digital signal processors (DSPs) or a combination of DSPs and VLIW processors.

According to some examples, as shown in FIG. 1, processing nodes 101-1 to 101-P each include respective compute/datapath circuitry 110. Compute/datapath circuitry 110 can be one or more cores of a multi-core processor, a field programmable gate array (FPGA) or an application specific integrated circuit (ASIC). As shown in FIG. 1, compute/datapath circuitry 110 includes functional units such as, but not limited to, a token synchronization unit (TSU) 111, an arithmetic and rotation unit (ARU) 112, a load/store unit (LSU) 113 and an out LSU 114. TSU 111, as described more below, facilitates a scheme for an efficient way for processing nodes of system 100 to produce and consume blocks of data associated with tokens. Tokens, for example, represent a validity of data produced or required (e.g., consumed) by a processing node, and an ordering of that data at a user-defined granularity. ARU 112, for example, can be utilized for processing data associated with tokens that are consumed by a processing node.

In some examples, as shown in FIG. 1, each compute/datapath circuitry 110 includes local memories 140. As described more below, an LSU 113 can be arranged to access one or more local memories included in local memories 140 to either load data to be processed/consumed or to update/store local indicators maintained at specified memory addresses of local memory 140 that indicate a processing node's capacity, via a specified communication channel, to receive data for processing. Processing nodes serving a role as a "producer" can be arranged to communicate with processing nodes serving a role as a "consumer". For example, a consumer processing node from among processing nodes 101-1 to 101-P communicates through respective input links 161-1 to 161-P routed via a memory interconnect switch 160. Memory interconnect switch 160, for example, enables a source/producer processing node to connect to/access any destination/consumer processing node's local memories. Communication through respective input links 161-1 to 161-P includes, but is not limited to, receiving data to be stored in pre-allocated buffers maintained in local memories 140 of a consumer processing node and/or receiving information to update token indicators (e.g., a remote indicator/buffer pointer) that indicate a state or status of a communication channel for the consumer processing node to process data or for a producer processing node to output data to the consumer processing node.

According to some examples, respective out LSUs 114-1 to 114-P are arranged to communicate with other processing nodes 101-1 to 101-P via respective output links 163-1 to 163-P through memory interconnect switch 160. For these examples, communication through output links 163-1 to 163-P can be from a producer or consumer processing node and include, but are not limited to, sending data to be stored in pre-allocated buffers maintained in local memories 140-1 of a consumer processing node and/or sending information to update token indicators (e.g., a remote indicator/buffer pointer) that indicate a state or status of a communication channel for the consumer or producer processing node to process data.

In some examples, as shown in FIG. 1, processing nodes 101-1 to 101-P include respective SDF gate circuitry 130-1 to 130-P. SDF gate circuitry 130-1 to 130-P can be types of circuitry to include an FPGA or an ASIC resident on or closely coupled with respective processing nodes 101-1 to 101-P and can serve as a type of HW accelerator to implement power saving clock stall/un-stall decisions. As described more below, SDF gate circuitry 130 includes logic and/or features to snoop, via snoop (Snp) 117, input links 161 to detect if/when information is received from another processing node to update token indicators for a communication channel. The logic and/or features of SDF gate circuitry 130 can include a cache to internally track a state or status of a communication channel for a consumer or producer processing node. Responsive to a status request from TSU 111 to consume or send data for consumption via the communication channel, the logic and/or features of SDF gate circuitry 130 determines whether conditions are met for the compute/datapath circuitry 110 of the requesting TSU 111 to consume or send the data via the communication channel. Conditions to be met would be whether a consuming processing node has sufficient data to process in an execution cycle or whether the producing processing node has enough space in the consumer's memory to receive subsequent data from the producing processing node. If conditions are not met (e.g., sufficient data has not been received for consumption or a buffer maintained in consumer's local memories 140 lacks capacity/space to receive produced data), the logic and/or features of SDF gate circuitry 130 de-asserts signal 105 to AND gate 120. The de-assertion of signal 105 to AND gate 120 causes clock (clk) 103 to be gated from DP clk 107 and thus stalls the compute/datapath circuitry 110 of the requesting TSU 111. The logic and/or features of SDF gate circuitry 130 continue to snoop, via Snp 117, input link 161 to detect updates to token indicators and re-asserts signal 105 if the updates cause the conditions to be met and thus un-gate clock 103 from DP clk 107 and end the stall of compute/datapath circuitry 110. LSU 113 then loads data maintained in local memories 140 for consumption if the processing node is serving the role of a consumer or out LSU 114 causes produced data to be sent if the processing node is serving the role of a producer. Stalling/unstalling the compute/datapath circuitry 110 automatically via clock gating allows for a dynamic ability to lower power consumption whenever there is not enough data or buffer space available in local memories 140 for executing a task associated with a workload or process. Also, this type of clock gating scheme greatly simplifies multicore/multiprocessor programming for a distributed computational model (e.g., based on an SDF graph) with a relatively low/minimal performance overhead, as tasks become self-synchronizing and self-scheduling by construction.

According to some examples, processing nodes 101-1 to 101-P include one or more respective registers (Reg(s)) 150-1 to 150-P. Reg(s) 150-1 to 150-P can be programmed to provide an indicator share address for a communication channel that can be a byte address in an associated logical memory that maps to physical addresses maintained in respective local memories 140-1 to 140-P. Depending on a role of a processing node with regard to the communication channel, the information stored or maintained at the indicator share address can be a read indicator value or a write indicator value. For example, if the processing node's role for a communication channel is as a consumer, the producer processing node will write a write indicator value to the indicator share address maintained in the local memories 140 of the consuming processing node. If the processing node's role for a communication channel is as a producer, the processing node serving as a consumer will write a read indicator value to the indicator share address maintained in the local memories 140 of the producing processing node. According to some examples, SDF gate circuitry 130-1 to 130-P monitors indicator share addresses maintained in respective local memories 140-1 to 140-P via respective Snp 117-1 to 117-P In some example, local memories 140-1 can include volatile or non-volatile types of memory. Volatile types of memory can include, but are not limited to, random-access memory (RAM), Dynamic RAM (DRAM), DDR synchronous dynamic RAM (DDR SDRAM), GDDR, HBM, static random-access memory (SRAM), thyristor RAM (T-RAM) or zero-capacitor RAM (Z-RAM). Non-volatile memory can include byte or block addressable types of non-volatile memory having a 3-dimensional (3-D) cross-point memory structure that includes, but is not limited to, chalcogenide phase change material (e.g., chalcogenide glass) hereinafter referred to as "3-D cross-point memory". Non-volatile types of memory can also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), anti-ferroelectric memory, resistive memory including a metal oxide base, an oxygen vacancy base and a conductive bridge random access memory (CB-RAM), a spintronic magnetic junction memory, a magnetic tunneling junction (MTJ) memory, a domain wall (DW) and spin orbit transfer (SOT) memory, a thyristor based memory, a magnetoresistive random access memory (MRAM) that incorporates memristor technology, spin transfer torque MRAM (STT-MRAM), or a combination of any of the above.

Figure 2:
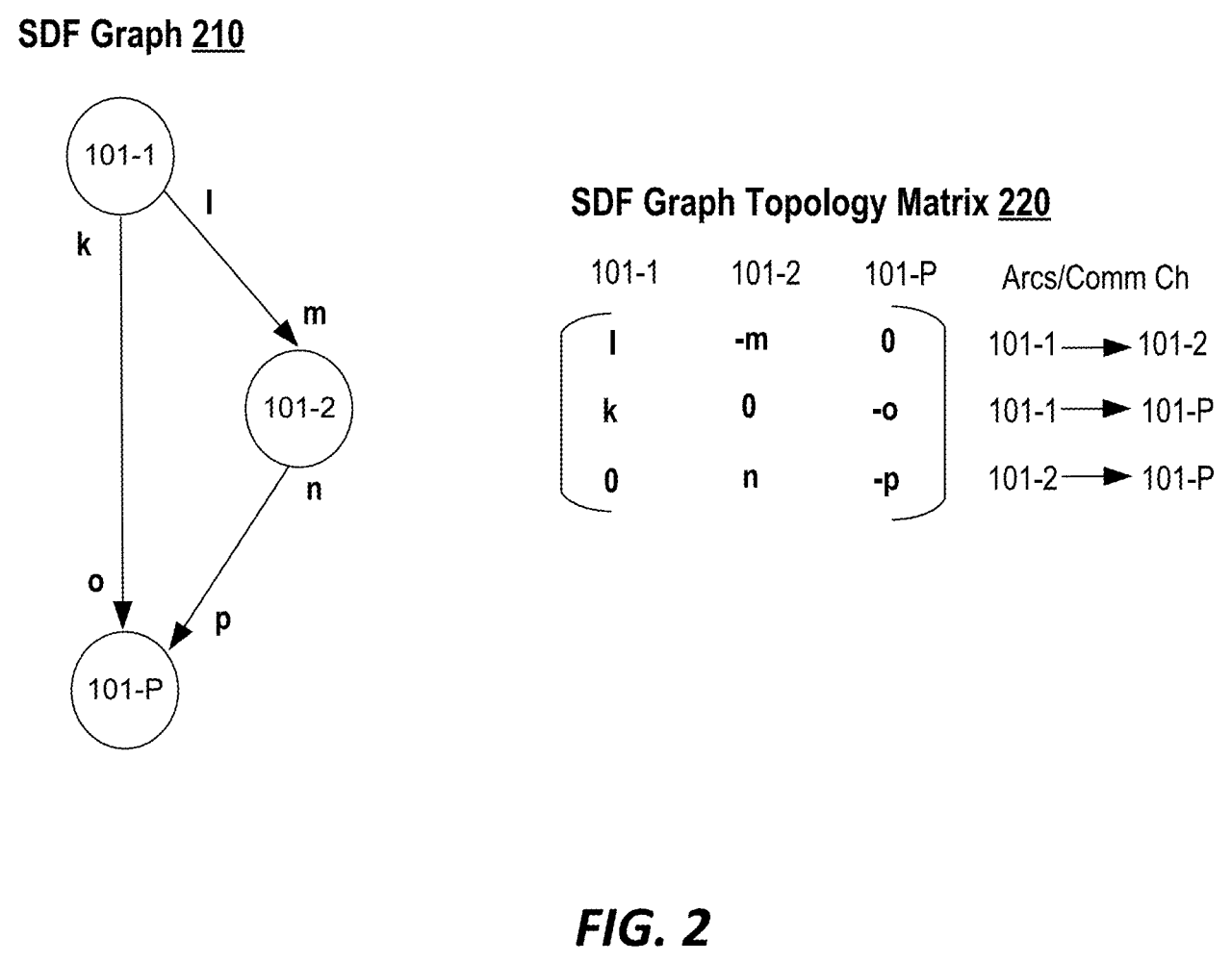

FIG. 2 illustrates an example SDF graph 210 and an example SDF graph topology matrix 220. As mentioned previously an SDF graph is a special case of a Kahn process network (KPN). According to some examples, SDF graph 210 represents a type of distributed computational model mapped to processing nodes 101-1, 101-2 and 101-P. For these examples, a number of tokens consumed and produced by a processing node is constant for each "firing" or execution cycle of that processing node. For example, regardless of the data contents or execution times, SDF graph 210 can be analyzed statically and therefore enable a compile-time task scheduling. This possibly results in an ability to map processing nodes (or groups of processing nodes) to processing units at a system initialization phase and then remain constant during execution. SDF graph 210, as shown in FIG. 2 depicts processing nodes 101-1, 101-2 and 101-P coupled together via three different arcs that can also represent communication channel data paths (FIFOs) between these processing nodes. The variables of "k", "1" and "n" of SDF graph 210 represent tokens that are produced by a processing node after that processing node executes (token production rate) and the variables "m", "o" and "p" represent a minimum number of tokens required to be present at a processing node before that processing node can start (token consumption rate).

According to some examples, a system is balanced if there is a positive repetition vector $\vec{r}$ that satisfies balance equations $r \vec{r} = \vec{0}$ with r being represented by SDF graph topology matrix 220 shown in FIG. 2, and a complete cycle exists. A chosen sequence at which processing nodes 101-1, 101-2 and 101-P of SDF Graph 210 are "fired" is deemed as SDF Graph 210's schedule. This schedule can have an influence on a required bounds of a communication channel (FIFO), as it will influence a state of SDF graph 210. For example, a specific number of tokens residing on each arc/communication channel at each given moment. If the schedule ensures that SDF graph 210 reaches its initial state after going through that schedule a finite number of times, then the schedule is a periodic schedule. As long as only sequences are used that represent finite complete cycles, an SDF graph such as SDF graph 210 will execute in bounded memory.

Figure 3:
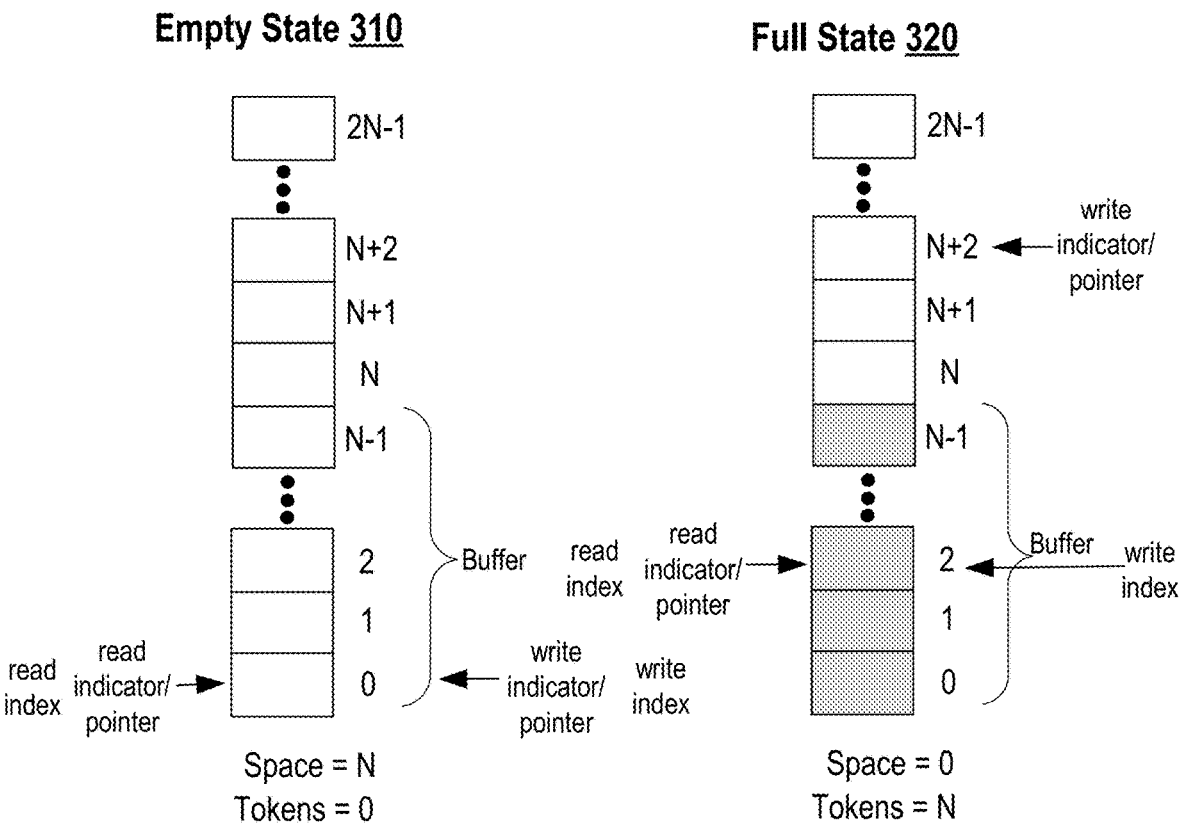
FIG. 3 illustrates an example channel token scheme.

FIG. 3 illustrates an example channel token scheme 300. As described more below, empty state 310 and full state 320 represents two states related to token management using read/write indicators/pointers. Despite previously mentioning FIFOs as communication channel data paths, an actual implementation of data communication between processing nodes does not need to be fully FIFO orientated. Also, tokens, as mentioned above, are not the actual data produced or consumed. Instead, tokens represent a validity of data produced/consumed by a processing node included in an SDF graph, and the ordering of that data at a user-defined granularity. Data can be stored in a buffer space in local memory at a processing node (e.g., local memories 140), and a memory requirement for a single communication channel depends on a maximum number of tokens that can be in that arc/communication channel. In some examples, each communication channel can have its own data unit size represented by a token. Assuming a data buffer is local to (and managed by) a processing node and/or compute/datapath circuitry that consumes data associated with tokens (the indicator of the arc), an overall amount of memory reserved for communication will depend on a number of communication channels, a maximum number of tokens in each arc at any point in time (depends on a chosen sequence, a topology matrix and an initial state) and a size of the data represented by those tokens.

In some examples, tokens have no real content and only the FIFO ordering of tokens, and an amount of available tokens in an arc/communication channel is relevant, token administration can be reduced to indicator handling. A number of tokens in a communication channel (and therefore also an available space) can be specified by a difference between a pair of indicators (read/write). Given a capacity (CAP) of N tokens, the indicators range from 0 to 2N−1 is represented by the blocks in FIG. 3 for both empty state 310 and full state 320. For the example channel token scheme 300 having an indicator range from 0 to 2N−1, a modulo division N represents an actual block index. Constraining a token capacity (N) to a power of 2 simplifies token management, but such a simplification can also significantly constrain buffer dimensioning and efficient use of storage resources. Hence, an assumption can be made that a buffer token capacity N can in principle be any finite integer>0

According to some examples, a number of spaces and tokens in a buffer can be calculated using example equation (1), where "wp" and "rp" represent a write pointer/indicator and a read pointer/indicator, respectively:

$$
\begin{aligned}
&(1) \text{ If (wp} < \text{N) and (rp} >= \text{N) then} \\
&\quad \text{spaces} = \text{rp} - \text{wp} - \text{N} \\
&\text{else} \\
&\quad \text{spaces} = \text{rp} - \text{wp} + \text{N} \\
&\quad \text{tokens} = \text{N} - \text{spaces}
\end{aligned}
$$

Although the token management scheme doesn't require specialized hardware in a processing node (e.g., a TSU and SDF Gate circuitry) and can be implemented in firmware, the architecture introduced above for system 100 and described more below has an ability to reduce firmware complexity and accelerate buffer handling, while minimizing or reducing synchronization issues that can arise from non-synchronous data accesses.

FIG. 4 illustrates an example table 400. According to some examples, table 400 shows indicator initialization values to be maintained in a cache accessible/managed by SDF gate circuitry of a processing node. These indicator initialization values, as indicated in table 400, have different meanings based on the role the processing node is serving for distributed computational model such as an SDF graph and on what indicator initialization values are first set. For example, if the role of the processing node is as a producer and the indicator initialization values for wr indicator (wr-idc) and read indicator (rd-idc) are both 0 that means no tokens in the communication channel, there are CAP spaces available to send data and the producer processing node is not blocked. Also, if the processing node is serving as a producer and the indicator initialization values for the wr-idc is N and the rd-idc is 0, that means wr-idc is N tokens ahead of rd-idc. Also, if N==CAP, the producer processing node waits until the associated consumer processing node updates the remote indicator (e.g., rd-idc maintained in local memories of the producing processing node) after tokens are consumed. If the processing node is serving as a consumer and indicator initialization values for rd-idc and wr-idc are both 0, that means no tokens in the communication channel. The consumer processing node then waits until the producer processing node increments its remote indicator (e.g., wr-idc maintained in local memories of the producer processing node) to a value between 1 and CAP. Also, if the processing node is serving as a consumer and the indicator initialization values for wr-idc is 0 and the rd-idc is N, which means there are N tokens in the communication channel because the producer processing node has already provided "real" tokens for their consumption or provided the "real" tokens at an initial stage (e.g., delay). Providing "real" tokens at an initial stage could be a requirement of an SDF graph for the SDF graph to be able to run indefinitely (consistent SDF graph)— usually this is not required for feed-forward SDF graphs.

Figure 5:
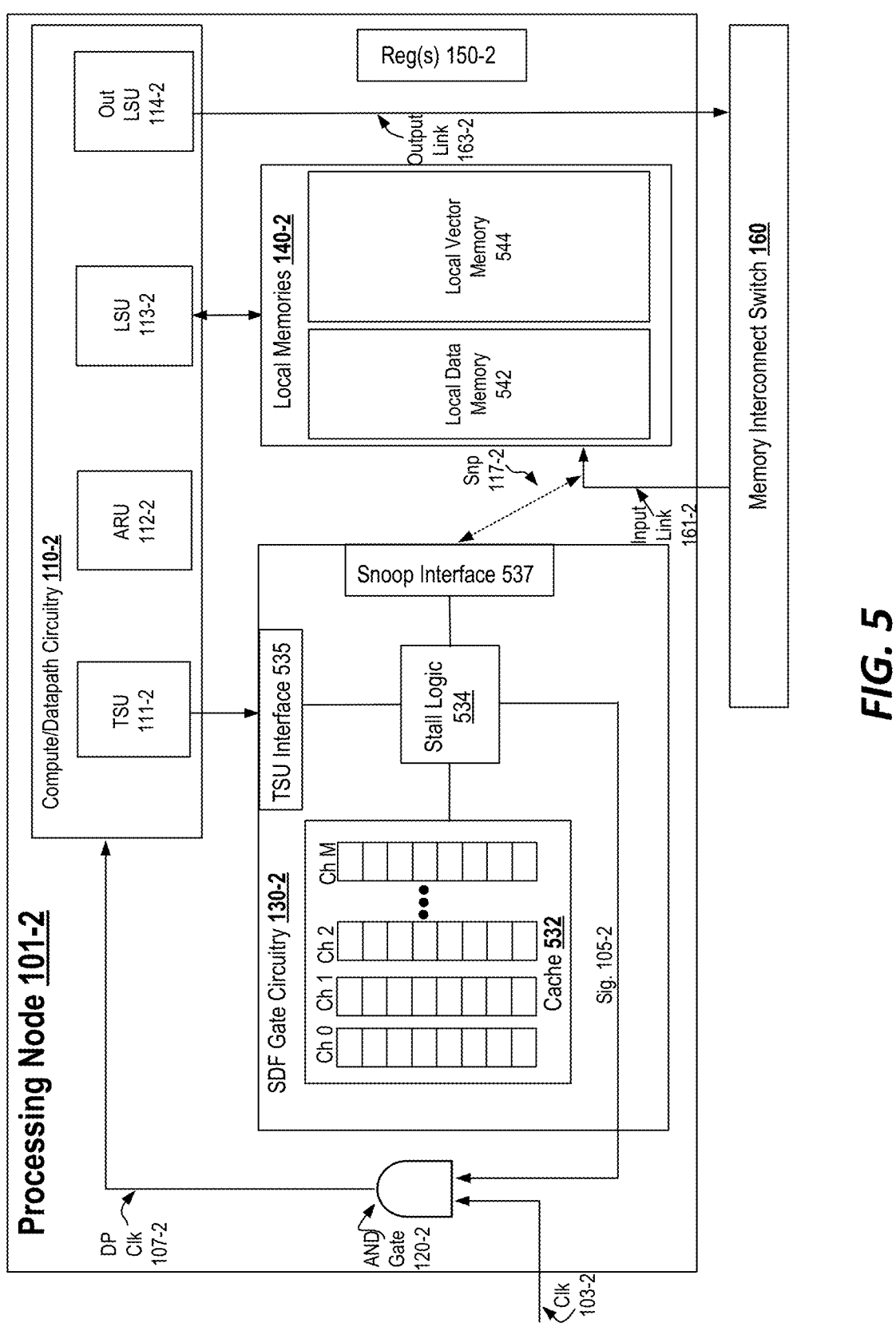
FIG. 5 illustrates an example processing node from the example system.

FIG. 5 illustrates additional details of processing node 101-2 from system 100. In some examples, the additional details are shown in FIG. 5 for SDF gate circuitry 130-2 and local memories 140-2. For these examples, SDF gate circuitry 130-2 includes a cache 532, a stall logic 534, a TSU interface 535 and a snoop interface 537. Also, local memories 140-2 include a local data memory 542 and a local vector memory 544. The other processing nodes of system 100 contain similar elements as those shown in FIG. 5 and listed above.

According to some examples, local data memory 542 can be arranged to store information associated with remote and local token indicators for one or more communication channels. Remote token indicators, for example, are written to local data memory 542 by other processing nodes using the communication channel according to distributed computational model such as SDF graph 210 that maps to processing nodes 101-1, 101-2 and 101-P. The remote token indicators can be written to an indicator share address that maps to physical addresses maintained in local data memory 542. The indicator share address, for example, can be set or programmed to respective reg(s) 150 at both processing nodes to indicate to the writing processing node what address to use to write remote token indicators for a particular communication channel to local data memory 542. The information to write the remote token indicator to local data memory 542, for example, is received via input link 161-2, with the information being routed through memory interconnect switch 160. The remote token indicators can be a read indicator value or a write indicator value, depending on whether processing node 101-2 is serving a role as a producer processing node or as a consumer processing node for that communication channel.

In some examples, local vector memory 544 of local memories 140-2 is arranged to maintain vector data to be processed by compute/datapath circuitry 110-2. For example, 1 token represents an amount of data known by processing nodes of system 100. The amount of data, in one example, can be based on 32 vectors, each vectors 1024 bits in size. A communication channel, for example, can have a limited capacity (CAP) of 8 tokens. Thus, the channel has a pre-allocated region in local vector memory 544 to hold data associated with 8 tokens.

According to some examples, logic and/or features of SDF gate circuitry 130-2 utilize cache 532 to maintain token status information for remote token indicators associated with one or more communication channels via one or more indicators. For example, as shown in FIG. 5, cache 532 can be utilized by logic and/or features of SDF gate circuitry 130-2 such as stall logic 534 to keep track of remote token indicators using a similar channel token scheme as described above for channel token scheme 300 (e.g., update read/write pointers/indicators to determine # of available spaces or tokens/blocks of data). Cache 532, for example, can be sized to accommodate token status information for one or more communication channels, such as communication channels 0 to M as shown in FIG. 5. For the example communication channels 0 to M shown in FIG. 5, M represents any whole, positive integer>=1. Also, TSU 111-2 relays local token indicator information to stall logic 534 via TSU interface 535 to indicate what range of remote indicator values would fulfill a triggering condition to stall or unstall dp clk 107-2. TSU 111-2 uses properties of the communication channel (e.g., token consumption rate) to determine what range of remote indicator values would fulfill the triggering condition.

In some examples, stall logic 534 couples with Snp 117-2 through snoop interface 537 to monitor input link 161-2 to determine whether remote token indicators have been updated. In other words, whether an updated read indicator value or an updated write indicator value has been written to the indicator share address for a communication channel being tracked in cache 532. As described in more detail below, write or read indicator value updates detected via Snp 117-2 causes stall logic 534 to update remote indicators/pointers for the communication channel in cache 532 and then based on local token information from TSU 111-2, determine whether to de-assert signal 105-2 to cause DP clk 107-2 to be gated or stopped and hence stall compute/datapath circuitry 110-2 based on availability of space or tokens needed to execute a task modeled for execution according to an SDF graph 210.

Figure 6:
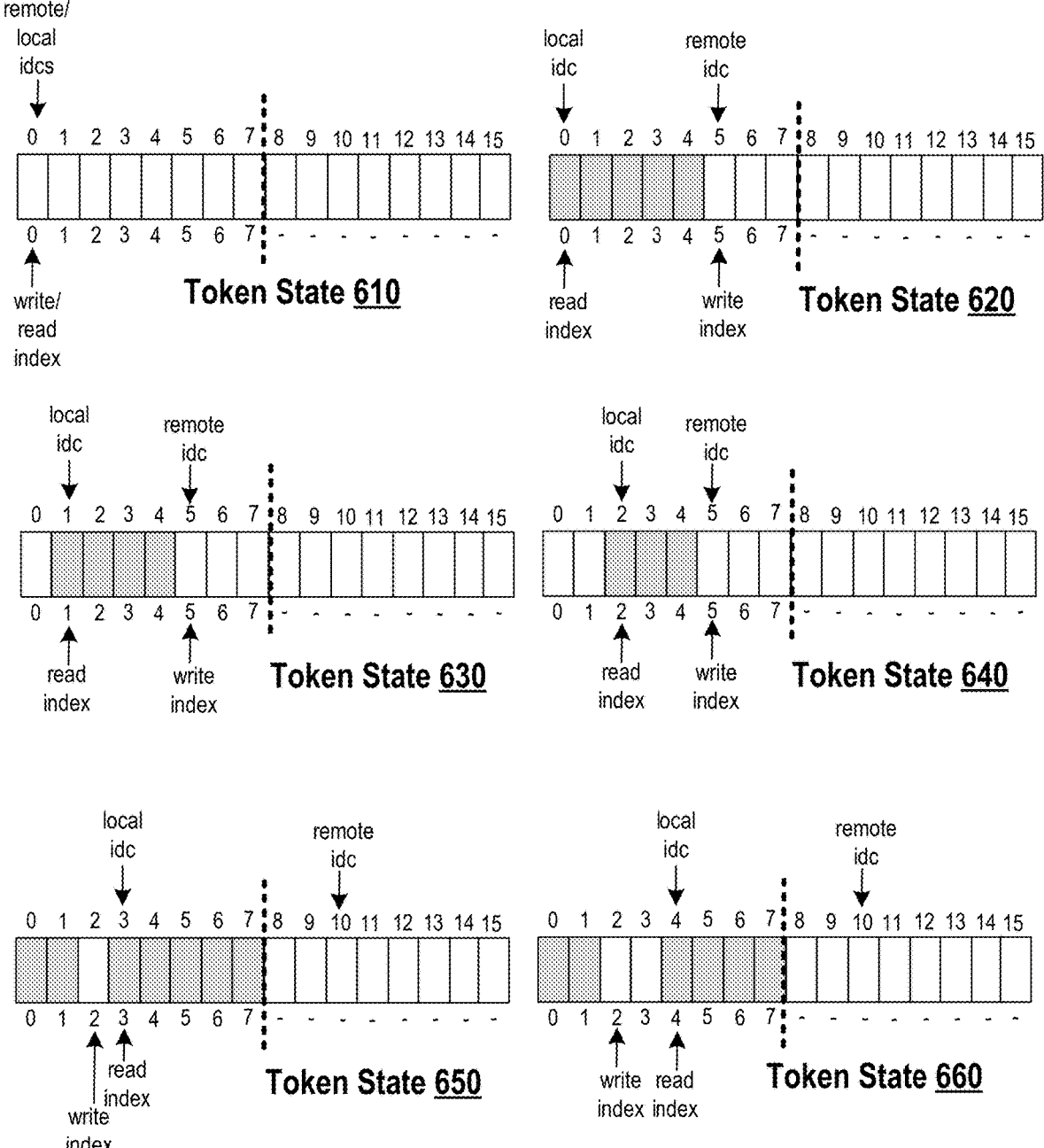
FIG. 6 illustrates an example consumer token states.

FIG. 6 illustrates example consumer token states 600. According to some examples, as shown in FIG. 6, various token states are shown for communication channel 2 (Ch 2). For these examples, token status information is tracked for an 8 token CAP on Ch 2 for a consumer processing node. Also, for these examples, logic and/or features of SDF gate circuitry 130-2 such as stall logic 534, track token states by updating a local idc pointer included in cache 532 to indicate that data associated with these tokens has been written to local vector memory 544 and is available for compute/datapath circuitry 110-2 to consume/process. Stall logic 534 also tracks token states by updating a remote idc pointer included in cache 532 to indicate spaces available for a producer processing node to send/write tokens to local vector memory 544.

In some examples, token state 610, as shown in FIG. 6, indicates that no data is currently maintained in local vector memory 544 for Ch 2 and thus all 8 token spaces are available to receive data. Token state 620 indicates that data associated with 5 tokens has been written to local vector memory 544, the remote idc pointer included in cache 532 is moved to remote idc pointer value 5 to indicate where subsequent writing of data to local vector memory 544 will start. Token state 630 indicates that data associated with the first of the 5 tokens has been consumed (e.g., in a FIFO manner) and the local idc pointer is moved to local idc pointer value 1 to indicate that data associated with token space 1 will be the next data consumed. Token state 640 indicates that data associated with the second of the 5 tokens has been consumed and the local idc pointer is moved to local idc pointer value 2 to indicate that data associated with token space 2 will be the next data consumed. Token state 650 indicates that data associated with the third of the 5 tokens has been consumed and the local idc pointer is moved to local idc pointer value 3 to indicate that data associated with token space 3 will be the next data consumed. Token state 650 also indicates that data associated with 5 more tokens has been written to local vector memory 544 and the remote idc pointer is moved to remote idc value 10 to indicate that an additional 5 tokens have been written to local vector memory 544. Token state 660 indicates that data associated with the fourth of the 5 tokens has been consumed and the local idc pointer is moved to local idc pointer value 4 to indicate that data associated with token space 4 will be the next data consumed.

Figure 7:
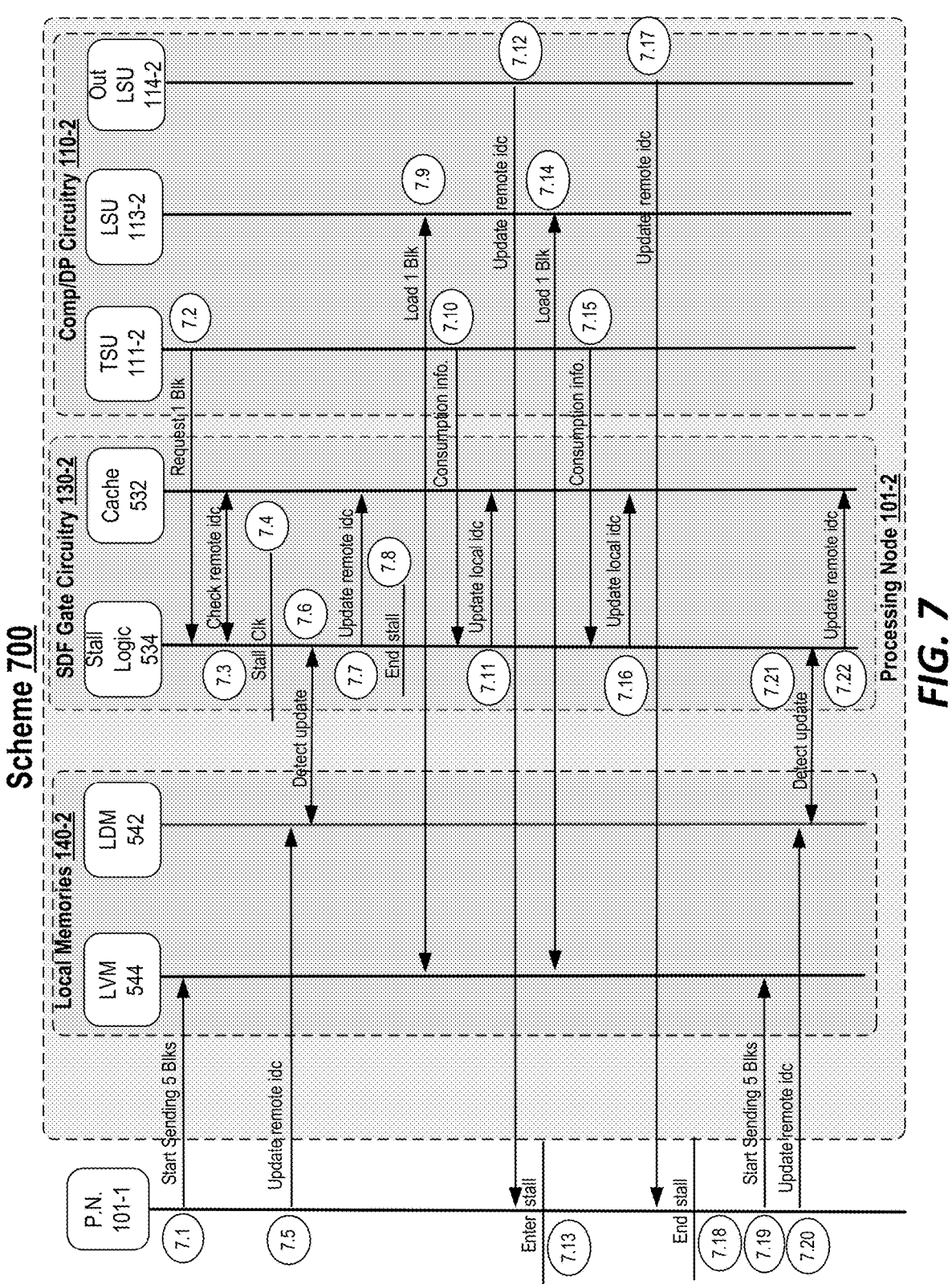
FIG. 7 illustrates an example scheme.

FIG. 7 illustrates an example scheme 700. In some examples, as shown in FIG. 7, scheme 700 can include processing node (PN) 101-1, logic/or features of SDF gate circuitry 130-2 and of compute/datapath circuitry 110-2 as well as local memories 140-2 of processing node 101-2. For these examples, processing node 101-2 can be arranged to execute a task according to a distributed computational model such as mapped to processing nodes 101-1, 101-2 and 101-P as shown in SDF graph 210. As mentioned previously, processing node 101-2 serves a role of a consumer processing node and processing node 101-1 serves a role of a producer processing node according to SDF graph 210. Also for these examples, processing node 101-2 receives data from processing node 101-1 via communication ch 2 that, as mentioned above, has a CAP of 8 tokens/blocks of data. At the beginning of scheme 700 no data has been sent and remote and local indicator (idc) pointers included in cache 532 both point to 0 such as mentioned above for token state 610 shown in FIG. 6. Also, for example scheme 700, functional elements of processing node 101-1 are programmed to produce 5 blocks of data at a time, while functional elements of processing node 101-2 are programmed to consume 1 block of data at a time. Although examples are not limited to this production/consumption ratio or to the producer In some examples, at 7.1, processing node 101-1 initiates the sending of 5 blocks of data to processing node 101-2's local vector memory 544 at locations 0-4 of a preallocated buffer.

According to some examples, at 7.2, TSU 111-2 of compute/datapath circuitry 110-2 indicates to stall logic 534 of SDF gate circuitry 130-2 that 1 block of data has been requested for consumption/processing.

In some examples, at 7.3, responsive to the indication of a request for 1 block of data (e.g., 1 token), stall logic 534 checks the remote idc pointer included in cache 532 to determine if data is available for processing. However, as mentioned above, remote and local pointers are initially set to values of 0 for communication ch 2 and even though processing node 101-1 is currently sending data to processing node 101-2, the data is not recognized as being available for processing until a remote idc value is written to local data memory 542 by processing node 101-1 to indicate that the data has been written to local vector memory 544.

In some examples, at 7.4, stall logic 534 causes dp clk 107-2 to be stalled by de-asserting signal 105-2 due to the local and remote idc pointers having a value of 0 indicating that data is not yet available to process.

According to some examples, at 7.5, processing node 101-1 updates a remote idc value in local data memory 542 to indicate that 5 blocks of data (5 tokens) have been written via communication ch 2 to local vector memory 544. For these examples, the update is written at an indicator share address of local data memory 542 that is known by processing node 101-1 (e.g., via information set in reg(s) 150-1 at processing node 101-1).

In some examples, at 7.6, stall logic 534 detects the update to the remote idc value for communication ch 2. For these examples, stall logic 534 detects the update through snoop interface 537 via snp 117-2 that monitors writes to local data memory 542 via input link 161-2.

According to some examples, at 7.7, stall logic 534 updates the remote idc pointer included in cache 532 to indicate that 5 token's worth of data is now available to be processed by compute/datapath circuitry 110-2 for communication ch 2. For example, token state 620 shown in FIG. 6 indicates that the remote idc pointer value has moved to remote idc pointer value 5 for communication ch 2.

In some examples, at 7.8, stall logic 534 asserts signal 105-2 to cause dp clk 107-2 to be reactivated/un-gated and thus end the stall of compute/datapath circuitry 110-2.

According to some examples, at 7.9, LSU 113-2 loads 1 block of the data written to local vector memory 544 for processing by compute/datapath circuitry 110-2 (e.g., processing by ARU 112-2).

In some examples, at 7.10, TSU 111-2 sends information to stall logic 534 to indicate consumption of the block of data and to indicate remaining blocks maintained in LVM 544. For these examples, the information indicates 1 block of data was consumed and 4 blocks remain to be consumed.

In some examples, at 7.11, stall logic 534 updates the local idc pointer value for communication ch 2 included in cache 532 to indicate that a first block of the 5 blocks of data has been consumed. For example, token state 630 shown in FIG. 6 indicates this update to the local idc pointer value.

According to some examples, at 7.12, out LSU 114-2 updates a remote idc value for communication ch 2 in local data memory maintained at processing node 101-1 (e.g., similar to LDM 542 maintained at processing node 101-2). For these examples, the update is written at an indicator share address of the local data memory at processing node 101-1 that is known by out LSU 114-2 based on information set or programmed to reg(s) 150-2 at processing node 101-2. The update reflects token state 630 that indicates 4 blocks of data are yet to be consumed and 4 token spaces are open In LDM 542 at processing node 101-2.

In some examples, at 7.13, since processing node 101-1 produces at a rate of 5 blocks of data for every 1 block of data consumed by processing node 101-2, and the update to its remote idc value indicates that only 4 spaces are available in processing node 101-2's local vector memory 544 buffer, logic and/or features of processing node 101-1's SDF gate circuitry 130-1 causes processing node 101-1's compute/datapath circuitry 110-1 to be stalled in a similar manner as mentioned above for SDF gate circuitry 130-2's stalling of compute/datapath circuitry 110-2 at 7.4.

According to some examples, at 7.14, LSU 113-2 loads 1 block of data written to local vector memory 544 for processing by compute/datapath circuitry 110-2.

In some examples, at 7.15, TSU 111-2 sends information to stall logic 534 to indicate consumption of another block of data and to indicate remaining blocks maintained in LVM 544. For these examples, the information indicates a second block of data was consumed and 3 blocks remain to be consumed.

In some examples, at 7.16, stall logic 534 updates the local idc pointer value for communication ch 2 included in cache 532 to indicate that a second block of the 5 blocks of data has been consumed. For example, token state 640 shown in FIG. 6 indicates this update to the local idc pointer value.

According to some examples, at 7.17, out LSU 114-2 updates the remote idc value for communication ch 2 in local data memory maintained at processing node 101-1. For these examples, the update reflects token state 640 that indicates 3 blocks of data are yet to be consumed and 5 token spaces are open.

In some examples, at 7.18, logic and/or features of processing node 101-1's SDF gate circuitry 130-1 causes processing node 101-1's compute/datapath circuitry 110-1 to become un-stalled or ends the stall in a similar manner as mentioned above for stall logic 534 ending the stall of compute/datapath circuitry 110-2 at 7.8.

According to some examples, at 7.19, processing node 101-1 initiates the sending of another 5 blocks of data to processing node 101-2's local vector memory 544 at locations 5-7 and 0-2 of the preallocated buffer.

In some examples, at 7.20, processing node 101-1 updates the remote idc value in local data memory 542 to indicate that 5 additional blocks of data (5 tokens) have been written via communication ch 2 to local vector memory 542. For these examples, the update is written at the indicator share address of local data memory 542.

According to some examples, at 7.21, stall logic 534 detects the update to the remote idc value for communication ch 2. For these examples, stall logic 534 detects the update through snoop interface 537 via snp 117-2 that monitors writes to local data memory 542 via input link 161-2.

In some examples, at 7.22, stall logic 534 updates the remote idc pointer value included in cache 532 to indicate that 5 additional token's worth of data is now available to be processed by compute/datapath circuitry 110-2 for communication ch 2. For example, token state 650 shown in FIG. 6 indicates that the remote idc pointer value has moved to remote pointer value 10 for communication ch 2 and indicates now that 1 space is available in local vector memory 544 to receive a token's worth or block of data, yet 7 token's worth or blocks of data are available for processing by processing node 101-2. Scheme 700 can return to 7.11 where the remote idc value is updated at processing node 101-1 to indicate that only 1 space is available and this results in processing node 101-1 being stalled until at least 5 spaces are again available in local vector memory 544 for communication ch 2 (e.g., as indicated in subsequent remote idc value updates for communication ch 2 received from out LSU 114-2).

FIG. 8 illustrates an example logic flow 800. Logic flow 800 is representative of the operations implemented by logic and/or features of a clock gate circuitry resident on or closely coupled with a consuming processing node. For example, logic and/or features of SDF gate circuitry 130-2 of processing node 101-2 as shown in FIGS. 1 and 5 and described for scheme 700 shown in FIG. 7.

In some examples, as shown in FIG. 8, logic flow 800 at block 810 maintains, at gate clock circuitry, a memory cache arranged to include an indicator of availability of data to be processed by compute circuitry of a first processing node. For example, SDF gate circuitry 130-2 maintains a remote idc in cache 532 to indicate availability of data to be processed by compute/datapath circuitry 110-2.

According to some examples, logic flow 800 at 820 detects that a second processing node has written one or more blocks of data to a buffer local to the first processing node. For example, processing node 101-1 writes one or more blocks of data to a buffer included in local vector memory 544 at processing node 101-2 and stall logic 534 of SDF gate circuitry 130-2 detects that writing of one or more blocks when processing node 101-1 updates a remote indicator value in local data memory 542 to indicate that writing of one or more blocks of data.

In some examples, logic flow 800 at 830 updates the indicator to the data structure to indicate a number of blocks of data that was detected as written to the buffer. For example, stall logic 534 updates the remote idc pointer in cache 532 to indicate the number of blocks of data that was detected as written to the buffer included in local vector memory 544.

According to some examples, logic flow 800 at block 840 gates a clock signal to the compute circuitry to cause the compute circuitry to stall responsive to the updated indicator indicating an insufficient number of blocks of data was detected for the compute circuitry to process in an execution cycle. For example, stall logic 534 de-asserts signal 105-2 to gate DP clk 107-2 to cause compute/datapath circuitry 110-2 to be stalled.

The logic flow shown in FIG. 8 can be representative of example methodologies for performing novel aspects described in this disclosure. While, for purposes of simplicity of explanation, the one or more methodologies shown herein are shown and described as a series of acts, those skilled in the art will understand and appreciate that the methodologies are not limited by the order of acts. Some acts can, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology can be required for a novel implementation.

A logic flow can be implemented in software, firmware, and/or hardware. In software and firmware embodiments, a software or logic flow can be implemented by computer executable instructions stored on at least one non-transitory computer readable medium or machine readable medium, such as an optical, magnetic or semiconductor storage. The embodiments are not limited in this context.

Figure 9:
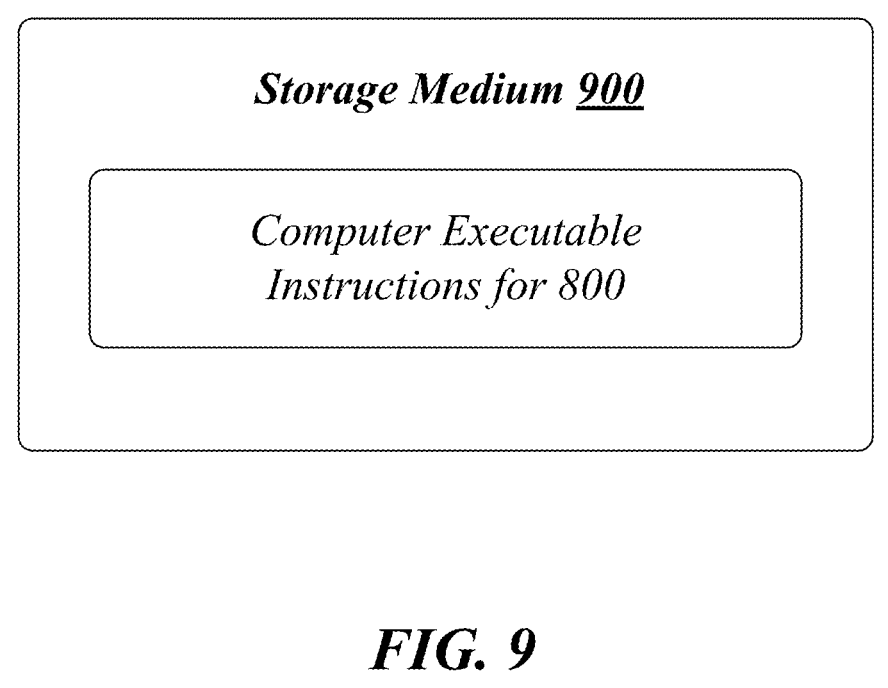

FIG. 9 illustrates an example of a storage medium. As shown in FIG. 9, the storage medium includes a storage medium 900. The storage medium 900 can comprise an article of manufacture. In some examples, storage medium 900 can include any non-transitory computer readable medium or machine readable medium, such as an optical, magnetic or semiconductor storage. Storage medium 900 can store various types of computer executable instructions, such as instructions to implement logic flow 800. Examples of a computer readable or machine readable storage medium can include any tangible media capable of storing electronic data, including volatile memory or non-volatile memory, removable or non-removable memory, erasable or non-erasable memory, writeable or re-writeable memory, and so forth. Examples of computer executable instructions can include any suitable type of code, such as source code, compiled code, interpreted code, executable code, static code, dynamic code, object-oriented code, visual code, and the like. The examples are not limited in this context.

The following examples pertain to additional examples of technologies disclosed herein.

Example 1. An example apparatus includes gate clock circuitry. The gate clock circuitry can maintain a memory cache arranged to include an indicator of availability of data to be processed by compute circuitry of a first processing node. Responsive to detecting that a second processing node has written one or more blocks of data to a buffer local to the first processing node, the clock gate circuitry can update the indicator to indicate a number of blocks of data that was detected as written to the buffer. Also, responsive to the updated indicator indicating an insufficient number of blocks of data was detected for the compute circuitry to process in an execution cycle, the clock gate circuitry to gate a clock signal to the compute circuitry to cause the compute circuitry to stall.

Example 2. The apparatus of example 1, wherein the one or more blocks of data written to the buffer local to the first processing node can be based on a distributed computational model that maps a communication channel data path from the second processing node to the first processing node.

Example 3. The apparatus of example 2, the distributed computation model can be based on an SDF graph.

Example 4. The apparatus of example 1, responsive to detecting that the second processing node has written one or more additional blocks of data to the buffer local to the first processing node, the clock gate circuitry can update the indicator to indicate the additional blocks of data that was detected as written to the buffer. Also, responsive to the updated indicator indicating a sufficient total number of blocks of data was detected as written to the buffer for the compute circuitry to process in an execution cycle, the clock gate circuitry can remove the gate to the clock signal to the compute circuitry to cause the compute circuitry to become un-stalled.

Example 5. The apparatus of example 4, the gate clock circuitry can update a second indicator included in the cache to indicate a last block of data included in the buffer that is to be processed by the compute circuitry in a subsequent execution cycle.

Example 6. The apparatus of example 1, the first processing node and the second processing node can be respective first and second processors included in a multi-processor system.

Example 7. The apparatus of example 6, the respective first and second processors can be VLIW processors, DSPs or a combination of DSP and VLIW processors.

Example 8. An example method can include maintaining, at gate clock circuitry, a memory cache arranged to include an indicator of availability of data to be processed by compute circuitry of a first processing node. The method can also include detecting that a second processing node has written one or more blocks of data to a buffer local to the first processing node. The method can also include updating the indicator to indicate a number of blocks of data that was detected as written to the buffer. The method can also include gating a clock signal to the compute circuitry to cause the compute circuitry to stall responsive to the updated indicator indicating an insufficient number of blocks of data was detected for the compute circuitry to process in an execution cycle.

Example 9. The method of example 8, the one or more blocks of data written to the buffer local to the first processing node can be based on a distributed computational model that maps a communication channel data path from the second processing node to the first processing node.

Example 10. The method of example 9, the distributed computational model can be based on an SDF graph.

Example 11. The method of example 8 can also include detecting that the second processing node has written one or more additional blocks of data to the buffer local to the first processing node. The method can also include updating the indicator to indicate the additional blocks of data that was detected as written to the buffer. The method can also include removing the gate to the clock signal to the compute circuitry to cause the compute circuitry to become un-stalled responsive to the updated indicator indicating a sufficient total number of blocks of data was detected as written to the buffer for the compute circuitry to process in an execution cycle.

Example 12. The method of example 11, can also include updating a second indicator included in the cache to indicate a last block of data included in the buffer that is to be processed by the compute circuitry in a subsequent execution cycle.

Example 13. The method of example 8, the first processing node and the second processing node are respective first and second processors included in a multi-processor system.

Example 14. The method of example 13, the respective first and second processors can be VLIW processors, DSPs or a combination of DSP and VLIW processors.

Example 15. An example at least one machine readable medium can include a plurality of instructions that in response to being executed by gate clock circuitry of a processing node, can cause the gate clock circuitry to carry out a method according to any one of examples 8 to 14.

Example 16. An example apparatus can include means for performing the methods of any one of examples 8 to 14.

Example 17. At least one non-transitory computer-readable storage medium to include a plurality of instructions, that when executed by gate clock circuitry of a processing node, can cause the gate clock circuitry to maintain a memory cache arranged to include an indicator of availability of data to be processed by compute circuitry of the processing node. The instructions can also cause the gate clock circuitry to detect that another processing node has written one or more blocks of data to a buffer local to the processing node. The instructions can also cause the gate clock circuitry to update the indicator to indicate a number of blocks of data that was detected as written to the buffer. The instructions can also cause the gate clock circuitry to responsive to the updated indicator indicating an insufficient number of blocks of data was detected for the compute circuitry to process in an execution cycle, gate a clock signal to the compute circuitry to cause the compute circuitry to stall.

Example 18. The at least one non-transitory computer-readable storage medium of example 17, the one or more blocks of data written to the buffer local to the processing node can be based on a distributed computational model that maps a communication channel data path from the other processing node to the processing node.

Example 19. The at least one non-transitory computer-readable storage medium of example 19, the distributed computation model can be based on an SDF graph.

Example 20. The at least one non-transitory computer-readable storage medium of example 17, the instructions can further cause the gate circuitry to detect that the other processing node has written one or more additional blocks of data to the buffer local to the processing node. The instructions can also further cause the gate clock circuitry to update the indicator to indicate the additional blocks of data that was detected as written to the buffer. Also, responsive to the updated indicator indicating a sufficient total number of blocks of data was detected as written to the buffer for the compute circuitry to process in an execution cycle, the instructions can further cause the gate clock circuitry to remove the gate to the clock signal to the compute circuitry to cause the compute circuitry to become un-stalled.

Example 21. The at least one non-transitory computer-readable storage medium of example 20, the instructions can cause the gate circuitry to update a second indicator included in the cache to indicate a last block of data included in the buffer that is to be processed by the compute circuitry in a subsequent execution cycle.

Example 22. The at least one non-transitory computer-readable storage medium of example 17, the processing node and the other processing node can be respective first and second processors included in a multi-processor system.

Example 23. The at least one non-transitory computer-readable storage medium of example 17, the respective first and second processors can be VLIW processors, DSPs or a combination of DSP and VLIW processors.

Example 24. An example system can include a first processing node to receive blocks of data to be consumed by a first compute circuitry at the first processing node in an execution cycle. The example system may also include a second processing node to write one or more blocks of data to a buffer local to the first processing node, the buffer to have a capacity of N blocks of data. The second processing node can also include gate clock circuitry to maintain a memory cache arranged to include an indicator of available capacity of the buffer to receive one or more data blocks produced by a second compute circuitry at the second processing node. Also, responsive to detecting that the first processing node has consumed one or blocks of data previously written to the buffer by the second processing node, the gate clock circuitry can update indicator to indicate a number of blocks of data that was detected as consumed. Also, responsive to the updated indicator indicating an insufficient available capacity of the buffer to receive data produced by the second compute circuitry, the clock gate circuitry can gate a clock signal to the compute circuitry to cause the second compute circuitry to stall.

Example 25. The system of example 24, the one or more blocks of data written to the buffer local to the first processing node can be based on a distributed computational model that maps a communication channel data path from the second processing node to the first processing node.

Example 26. The system, of example 25, the distributed computation model can be based on an SDF graph.

Example 27. The system of example 24, responsive to detecting that the first processing node has consumed one or more additional blocks of data previously written to the buffer by the second processing node, the clock gate circuitry can update the indicator to indicate the additional blocks of data that was detected as being consumed. Also, responsive to the updated indicator indicating a sufficient available capacity was detected in the buffer to receive one or more additional blocks of data produced by the second compute circuitry, the clock gate circuitry can remove the gate to the clock signal to the second compute circuitry to cause the second compute circuitry to become un-stalled.

Example 28. The system of example 24, the first processing node and the second processing node can be respective first and second processors included in a multi-processor system.

Example 29. The system of example 28, the respective first and second processors can be VLIW processors, DSPs or a combination of DSP and VLIW processors.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

While various examples described herein could use the System-on-a-Chip or System-on-Chip ("SoC") to describe a device or system having a processor and associated circuitry (e.g., Input/Output ("I/O") circuitry, power delivery circuitry, memory circuitry, etc.) integrated monolithically into a single integrated circuit ("IC") die, or chip, the present disclosure is not limited in that respect. For example, in various examples of the present disclosure, a device or system could have one or more processors (e.g., one or more processor cores) and associated circuitry (e.g., Input/Output ("I/O") circuitry, power delivery circuitry, etc.) arranged in a disaggregated collection of discrete dies, tiles and/or chiplets (e.g., one or more discrete processor core die arranged adjacent to one or more other die such as memory die, I/O die, etc.). In such disaggregated devices and systems the various dies, tiles and/or chiplets could be physically and electrically coupled together by a package structure including, for example, various packaging substrates, interposers, interconnect bridges and the like. Also, these disaggregated devices can be referred to as a system-on-a-package (SoP).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
    gate clock circuitry to:
        maintain a memory cache arranged to include an indicator of availability of data to be processed by compute circuitry of a first processing node;
        responsive to detecting that a second processing node has written one or more blocks of data to a buffer local to the first processing node, update the indicator to indicate a number of blocks of data that was detected as written to the buffer; and
        responsive to the updated indicator indicating an insufficient number of blocks of data was detected for the compute circuitry to process in an execution cycle, gate a clock signal to the compute circuitry to cause the compute circuitry to stall.

2. The apparatus of claim 1, wherein the one or more blocks of data written to the buffer local to the first processing node is to be based on a distributed computational model that maps a communication channel data path from the second processing node to the first processing node.

3. The apparatus of claim 2, wherein the distributed computation model is based on a synchronous data flow (SDF) graph.

4. The apparatus of claim 1, further comprising the gate clock circuitry to:
    responsive to detecting that the second processing node has written one or more additional blocks of data to the buffer local to the first processing node, update the indicator to indicate the additional blocks of data that was detected as written to the buffer; and
    responsive to the updated indicator indicating a sufficient total number of blocks of data was detected as written to the buffer for the compute circuitry to process in an execution cycle, remove the gate to the clock signal to the compute circuitry to cause the compute circuitry to become un-stalled.

5. The apparatus of claim 4, further comprising the gate clock circuitry to:
    update a second indicator included in the cache to indicate a last block of data included in the buffer that is to be processed by the compute circuitry in a subsequent execution cycle.

6. The apparatus of claim 1, wherein the first processing node and the second processing node are respective first and second processors included in a multi-processor system.

7. The apparatus of claim 6, wherein the respective first and second processors comprise very long instruction word (VLIW) processors, digital signal processors (DSPs) or a combination of DSP and VLIW processors.

8. A method comprising:

maintaining, at gate clock circuitry, a memory cache arranged to include an indicator of availability of data to be processed by compute circuitry of a first processing node;

detecting that a second processing node has written one or more blocks of data to a buffer local to the first processing node;

updating the indicator to indicate a number of blocks of data that was detected as written to the buffer; and gating a clock signal to the compute circuitry to cause the compute circuitry to stall responsive to the updated indicator indicating an insufficient number of blocks of data was detected for the compute circuitry to process in an execution cycle.

9. The method of claim 8, wherein the one or more blocks of data written to the buffer local to the first processing node is based on a distributed computational model that maps a communication channel data path from the second processing node to the first processing node.

10. The method of claim 9, wherein the distributed computational model is based on a synchronous data flow (SDF) graph.

11. The method of claim 8, further comprising:

detecting that the second processing node has written one or more additional blocks of data to the buffer local to the first processing node;

updating the indicator to indicate the additional blocks of data that was detected as written to the buffer; and removing the gate to the clock signal to the compute circuitry to cause the compute circuitry to become un-stalled responsive to the updated indicator indicating a sufficient total number of blocks of data was detected as written to the buffer for the compute circuitry to process in an execution cycle.

12. The method of claim 11, further comprising:

updating a second indicator included in the cache to indicate a last block of data included in the buffer that is to be processed by the compute circuitry in a subsequent execution cycle.

13. The method of claim 8, wherein the first processing node and the second processing node are respective first and second processors included in a multi-processor system.

14. At least one non-transitory computer-readable storage medium, comprising a plurality of instructions, that when executed by gate clock circuitry of a processing node, cause the gate clock circuitry to:

maintain a memory cache arranged to include an indicator of availability of data to be processed by compute circuitry of the processing node;

detect that another processing node has written one or more blocks of data to a buffer local to the processing node;

update the indicator to indicate a number of blocks of data that was detected as written to the buffer; and responsive to the updated indicator indicating an insufficient number of blocks of data was detected for the compute circuitry to process in an execution cycle, gate a clock signal to the compute circuitry to cause the compute circuitry to stall.

15. The at least one non-transitory computer-readable storage medium of claim 14, wherein the one or more blocks of data written to the buffer local to the processing node is to be based on a distributed computational model that maps a communication channel data path from the other processing node to the processing node.

16. The at least one non-transitory computer-readable storage medium of claim 15, wherein the distributed computation model is based on a synchronous data flow (SDF) graph.

17. The at least one non-transitory computer-readable storage medium of claim 14, the instructions to further cause the gate circuitry to:

detect that the other processing node has written one or more additional blocks of data to the buffer local to the processing node;

update the indicator to indicate the additional blocks of data that was detected as written to the buffer; and responsive to the updated indicator indicating a sufficient total number of blocks of data was detected as written to the buffer for the compute circuitry to process in an execution cycle, remove the gate to the clock signal to the compute circuitry to cause the compute circuitry to become un-stalled.

18. The at least one non-transitory computer-readable storage medium of claim 17, the instructions to further cause the gate circuitry to:

update a second indicator included in the cache to indicate a last block of data included in the buffer that is to be processed by the compute circuitry in a subsequent execution cycle.

19. The at least one non-transitory computer-readable storage medium of claim 14, wherein the processing node and the other processing node are respective first and second processors included in a multi-processor system.

20. A system comprising:

a first processing node to receive blocks of data to be consumed by a first compute circuitry at the first processing node in an execution cycle; and a second processing node to write one or more blocks of data to a buffer local to the first processing node, the buffer to have a capacity of N blocks of data, wherein the second processing node includes gate clock circuitry to:

maintain a memory cache arranged to include an indicator of available capacity of the buffer to receive one or more data blocks produced by a second compute circuitry at the second processing node;

responsive to detecting that the first processing node has consumed one or blocks of data previously written to the buffer by the second processing node, update the indicator to indicate a number of blocks of data that was detected as consumed; and responsive to the updated indicator indicating an insufficient available capacity of the buffer to receive data produced by the second compute circuitry, gate a clock signal to the compute circuitry to cause the second compute circuitry to stall.

21. The system of claim 20, wherein the one or more blocks of data written to the buffer local to the first processing node is to be based on a distributed computational model that maps a communication channel data path from the second processing node to the first processing node.

22. The system of claim 21, wherein the distributed computation model is based on a synchronous data flow (SDF) graph.

23. The system of claim 20, further comprising the gate clock circuitry to:

responsive to detecting that the first processing node has consumed one or more additional blocks of data previously written to the buffer by the second processing node, update the indicator to indicate the additional blocks of data that was detected as being consumed; and responsive to the updated indicator indicating a sufficient available capacity was detected in the buffer to receive one or more additional blocks of data produced by the second compute circuitry, remove the gate to the clock signal to the second compute circuitry to cause the second compute circuitry to become un-stalled.

24. The system of claim 20, wherein the first processing node and the second processing node are respective first and second processors included in a multi-processor system.

25. The system of claim 24, wherein the respective first and second processors comprise very long instruction word (VLIW) processors, digital signal processors (DSPs) or a combination of DSP and VLIW processors.

\*    \*    \*    \*    \*